(12) United States Patent
Nielsen et al.

(10) Patent No.: US 12,539,646 B2
(45) Date of Patent: Feb. 3, 2026

(54) MOLD ARRANGEMENT FOR PRODUCING A PREFORM ELEMENT OF A WIND TURBINE BLADE

(71) Applicant: Siemens Gamesa Renewable Energy A/S, Brande (DK)

(72) Inventors: Anette Struve Nielsen, Galten (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 35 days.

(21) Appl. No.: 18/558,612

(22) PCT Filed: May 3, 2022

(86) PCT No.: PCT/EP2022/061804
§ 371 (c)(1),
(2) Date: Nov. 2, 2023

(87) PCT Pub. No.: WO2022/238175
PCT Pub. Date: Nov. 17, 2022

(65) Prior Publication Data
US 2024/0239022 A1    Jul. 18, 2024

(30) Foreign Application Priority Data
May 10, 2021    (EP) .................... 21172975

(51) Int. Cl.
*B29C 33/04* (2006.01)
*B29C 70/44* (2006.01)
*B29C 70/54* (2006.01)
*B29L 31/08* (2006.01)

(52) U.S. Cl.
CPC ............ *B29C 33/046* (2013.01); *B29C 70/44* (2013.01); *B29C 70/54* (2013.01); *B29L 2031/085* (2013.01)

(58) Field of Classification Search
CPC . B29C 33/04; B29C 2033/042; B29C 33/046; B29C 33/048; B29C 2035/0211; B29C 35/04; B29C 35/049
See application file for complete search history.

(56) References Cited

U.S. PATENT DOCUMENTS 4,201,823 A * 5/1980 Russell .................. B29C 70/44
                                                      264/137
5,047,198 A    9/1991 Kim
(Continued)

FOREIGN PATENT DOCUMENTS

CN    102950689 A    3/2013
CN    209937761 U    1/2020
(Continued)

OTHER PUBLICATIONS

PCT International Search Report and Written Opinion of International Searching Authority mailed Aug. 25, 2022 corresponding to PCT International Application No. PCT/EP2022/061804 filed May 3, 2022.

*Primary Examiner* — Matthew J Daniels
(74) *Attorney, Agent, or Firm* — Schmeiser, Olsen & Watts, LLP

(57) ABSTRACT

A mold arrangement for producing a preform element of a wind turbine blade includes a mold carrier and a plate- or tray-like mold element arranged at the mold carrier with a form defining mold surface adapted to receive preform building material, a first heating device arranged below the mold element for heating the preform building material from below the mold element, and a second heating device for heating the preform building material from above.

9 Claims, 2 Drawing Sheets

(56) References Cited

U.S. PATENT DOCUMENTS

Figure 1:
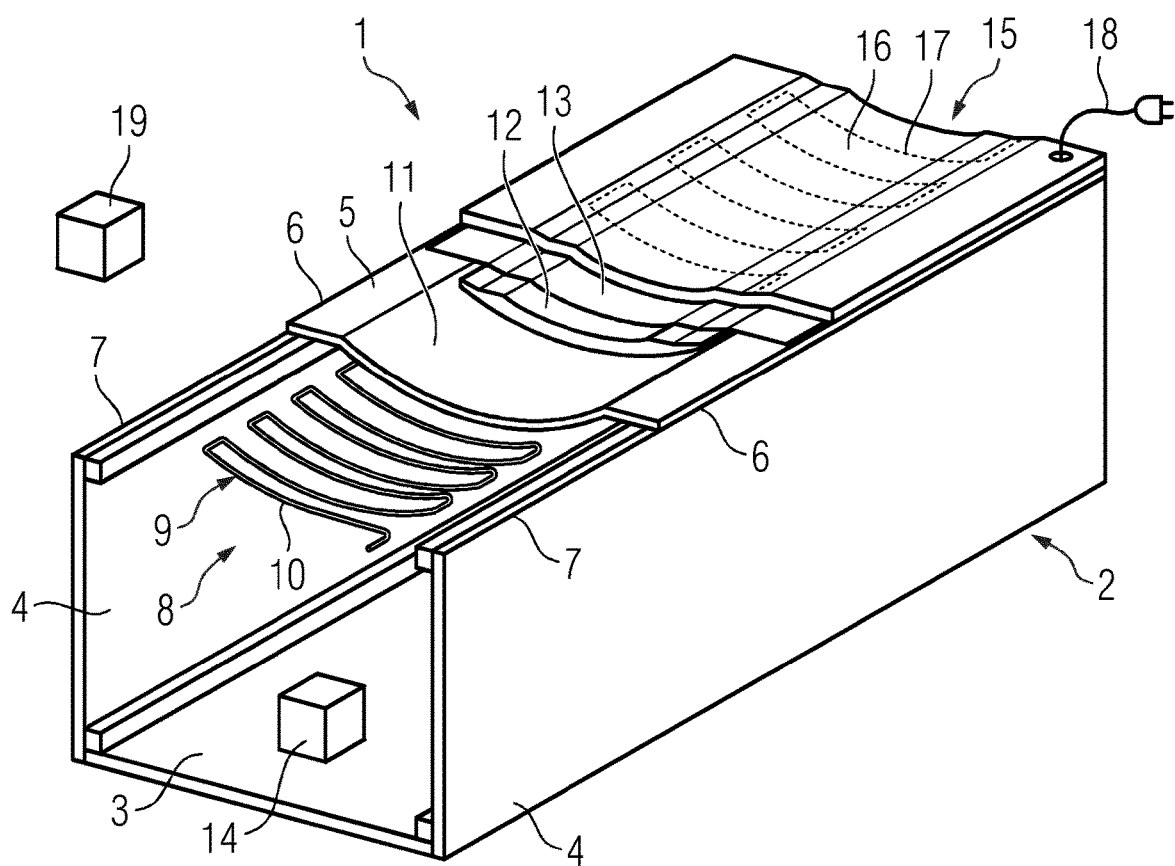

| | | | |
|---|---|---|---|
| 9,782,918 B2 | 10/2017 | Davis et al. | |
| 10,173,379 B2 | 1/2019 | Feigenblum et al. | |
| 2004/0217110 A1* | 11/2004 | Gray | H05B 3/34 |
| | | | 219/528 |
| 2007/0108655 A1 | 5/2007 | Aramburu et al. | |
| 2011/0198013 A1* | 8/2011 | Christiansen | B29C 33/02 |
| | | | 156/359 |
| 2014/0327178 A1* | 11/2014 | Davis | B29C 33/02 |
| | | | 264/258 |

FOREIGN PATENT DOCUMENTS

| | | |
|---|---|---|
| DE | 102004025704 A1 | 12/2005 |
| EP | 1603723 A1 | 12/2005 |
| EP | 2357069 A1 | 8/2011 |
| EP | 2362824 A1 | 9/2011 |
| EP | 2661357 A1 | 11/2013 |
| EP | 2731772 A1 | 5/2014 |
| EP | 3018342 A1 | 5/2016 |
| EP | 3102396 A1 | 12/2016 |
| EP | 4067037 A1 | 10/2022 |
| EP | 4067038 A1 | 10/2022 |
| EP | 4079483 A1 | 10/2022 |
| EP | 4091803 A1 | 11/2022 |
| TW | M588622 U | 1/2020 |
| WO | 2005049298 A1 | 6/2005 |
| WO | 2010129496 A2 | 11/2010 |
| WO | 2013041481 A1 | 3/2013 |
| WO | 2019115337 A1 | 6/2019 |
| WO | 2019115522 A1 | 6/2019 |
| WO | 2019145240 A1 | 8/2019 |

* cited by examiner

MOLD ARRANGEMENT FOR PRODUCING A PREFORM ELEMENT OF A WIND TURBINE BLADE

CROSS-REFERENCE TO RELATED APPLICATIONS

This application claims priority to PCT Application No. PCT/EP2022/061804, having a filing date of May 3, 2022, which claims priority to EP Application No. 21172975.1, having a filing date of May 10, 2021, the entire contents both of which are hereby incorporated by reference.

FIELD OF TECHNOLOGY

The following refers to a mold arrangement for producing a preform element of a wind turbine blade.

BACKGROUND

Conventionally, a wind turbine comprises among others several turbine blades attached to a hub. The blades interact with the wind making the hub rotate. A generator is coupled to the hub, which generator is driven by the rotating hub. The turbine blades of nowadays turbines have enormous dimensions in length and width and are becoming even larger in size.

A wind turbine blade comprises a hollow blade shell having a circular cross-section in the area of the root, which root is fixed to the hub, which circular cross-section changes to an airfoil cross-section towards the blade tip. In the inner of the hollow blade shell, in the airfoil cross-section region, one or more webs are arranged, which are fixed to the lower and upper shell parts for reinforcing the hollow shell. The hollow shell itself is usually made of fiber mats, desirably glass fiber mats, which are arranged in several layers, and core elements for example made of wood like balsa wood or formed polymer etc. The blade building material is infused with resin, so that, when the resin is cured, the whole blade building material is firmly embedded in the hardened resin matrix.

Several techniques are known for producing a turbine blade. According to a first technology, two separate shell halves are produced, i.e., a lower and an upper shell half, which are then fixed or glued together along their abutting edges. Another technology is the one-shot technology, where the whole blade is produced as a one-piece blade, wherein all blade building material is arranged in a respective mold and then completely infused with the resin. No matter which technology is used, it is always necessary to arrange the blade building material in the respective half shell mold or the one-shot mold. This involves arranging each separate fiber mat like the glass fiber mats in the respective mold in chordwise direction. If the so-called butterfly technology, in which as mentioned the two separate half shells are produced, is used, each fiber mat corresponds to the half of the circumference of the respective half shell and needs to be manually arranged in the respective half mold. If the one-shot technology is used, each fiber mat corresponds to the whole circumference of the complete shell or blade body, seen in the circumferential direction. Also, this arrangement is done manually. In addition to arranging the fiber mats, it is also necessary to arrange further building material like the core elements or any other reinforcing elements etc., which arrangement is also done manually.

According to another technology, the blade shell is produced by using pre-fabricated preform elements made of a blade building or preform element building material, which comprises fiber mats and a binding agent and, optional, core elements. The binding agent is arranged only locally and is used for fixating the fiber mats to each other, so that the preform element has a specifically defined setup and shape, but still has an open and therefore infusible structure. A number of these preform elements, which have a remarkable width of approximately 2-5 m and a length of approximately 10-12 m, is used for building a half shell or the whole one-piece shell by finally embedding them in a resin matrix. As also these preform elements require the arrangement of the respective preform building material like fiber mats, the binding agent and, optionally, the core elements, there is a need for and arrangement allowing for simply and quickly producing such a preform element.

SUMMARY

An aspect relates to provide an arrangement which allows for the simple and fast production of a preform element of a wind turbine blade.

To address this aspect, embodiments of the invention propose a mold arrangement for producing a preform element of a wind turbine blade, comprising a mold carrier and a plate- or tray-like mold element arranged on the carrier with a form-defining mold surface adapted to receive preform building material, a first heating means or first heating device arranged below the mold element for heating the preform building material from below the mold element, and a second heating means or second heating device for heating the preform building material from above.

According to embodiments of the invention, a specific mold arrangement is used for manufacturing preforms. This mold arrangement is adapted in its size to the size of the preform element, and therefore roughly corresponds in its width and length to the width and length of the preform element to be produced. The mold therefore is way smaller than molds used for producing a complete half shell or the one-piece shell.

The mold arrangement comprises a mold carrier, which is the basic mold construction, on which the production process is performed. On this mold carrier, which is usually arranged on the floor, a plate- or tray-like mold element is arranged. This plate- or tray-like mold element is a thinner element, which is adapted to receive the blade building material. The mold element has a mold surface, on which the preform building material is arranged. This mold surface may be flat or may be curved, corresponding on the requested geometry of the preform element to be built. On this mold surface, the preform building material, i.e. especially the fiber mats, are arranged. This is quite simple and can be done manually, as the dimension of each fiber mat corresponds in maximum to the final width and length of the preform element. Therefore, the workers can easily arrange the one or several fiber mats in respective layers on the mold surface. The same is true for the optionally needed core elements and the needed and locally provided binding agent.

Furthermore, the mold arrangement comprises two separate heating means, which are adapted to heat the building material after its arrangement on the mold surface. A first heating means is arranged below the mold element and is adapted to heat the preform building material from below. It therefore heats the plate- or tray-like mold element and via this mold element the building material. The second heating means is adapted to heat the blade building material from above. This second heating means therefore applies the heat from the opposite direction compared to the first heating element. Therefore, the building material is perfectly heated from both sides and over the whole area, where it is arranged, in order to melt the binding agent, which then wets the fiber mats and, if arranged, the core elements, for fixating them after the binding agent is again cured in order to receive a fixated and stabilized preform element.

It is obvious, that this mold arrangement allows for a simple and fast production of a preform element. As mentioned, it is possible to easily and quickly arrange the building material on the mold surface, as the dimension of the preform building material, especially of the fiber mats, solely corresponds to the final dimension of the preform element. Also, the heating process can be performed very quickly, as a double-side heating is performed, using the first and second heating means, which are arranged on opposite sides of the building material and which allow for a very fast heating process. After the heating is performed, it is only necessary to cool the building material for curing the previously melted binding agent, which is applied as a powder or granulate or is a respective glue, for finally receiving the preform element.

According to a first embodiment, the first heating means comprises one or more pipes extending below the mold element adapted to carry a circulating heating means. The first heating means comprises a pipe arrangement, which is for example in a meandering shape arranged directly below the bottom of the mold element. It is arranged as close as possible to the bottom of the mold element or directly fixed to the bottom of the mold element to have an excellent heat transfer. The geometry of the pipe or pipes respectively the pipe arrangement is such that it covers nearly the whole bottom surface, respectively at least an area, on which on the mold surface the blade building material is applied. The pipe arrangement geometry is such that the heat is applied uniformly.

Through the pipe or pipes a heating means circulates. Therefore, the pipe arrangement is connected to or is a part of a circuit, in which the heating means circulates. This circuit comprises a respective means for circulating the heating means and for tempering it to a requested heating temperature.

The heating fluid may either be tempered heating water or tempered heating air. Therefore, the circuit comprises a respective water pump or a respective blowing means for circulating either the heating water or the heating air.

In an alternative to the pipe arrangement, the first heating means may also comprise one or more wires extending below the mold element and is coupled or is to be coupled to a power source. In this embodiment, the heating is performed by using electric current flowing through the wire or wires which are thereby heated. Again, the wire or wires are arranged in a geometry which covers most of the bottom surface of the mold element, again in the meandering shape. Also, these wires are attached directly to the bottom of the mold element for a best heating performance.

As several embodiments are given for the first heating means, also the second heating means can be realized in different ways. According to a first embodiment, the second heating means is a heating blanket adapted to be arranged on the mold element for covering the preform building material. This blanket corresponds in its size at least to the size of the area on which the preform building material is arranged, it is to a certain extend larger, so that the preform building material is completely covered. It corresponds to the size of the mold element itself. As it is a blanket, which is flexible, it perfectly adapts to the shape of the underlying structure, here the blade building material and also the mold surface, respectively the mold element, as far as the blanket extends also in these areas. So, also this blanket allows for an almost direct heat transfer. Usually, a vacuum foil used for applying a vacuum for pressing the building material is arranged on top of the building material, to which foil it is referred later, which foil is then directly covered by the blanket respectively on which the heating blanket lies. So, the heating blanket indirectly covers the preform building material, as a vacuum foil is sandwiched between.

As also the dimension of the heating blanket roughly corresponds to the dimension of the preform element to be built, also this heating blanket may easily be applied manually.

The heating blanket may comprise one or more wires to be coupled to a power source. Also, this second heating means in form of the heating blanket is therefore heated by an electric current flowing through the wire arrangement. Again, the wire arrangement respectively its geometry is such that it has for example a meandering shape and covers the whole necessary heating area, while certainly other geometries are feasible.

In a second embodiment, the second heating means may comprise a lid to be attached to the mold element and adapted to cover the preform building material while creating a space between the mold surface and the lid, which space is coupled to a heating air source blowing a circulating heating air in the space. The second embodiment proposes a second heating means in form of an air heating means. The mold element with the preform building material arranged on the mold surface is covered by a lid. This lid defines a certain space between its lid side facing the mold element and the mold element. In this heating space the tempered heating air is blown, which heats the building material and which is exhausted from the space, as the second heating means is connected to or is a part of a heating air circuit comprising a respective ventilation means and tempering means. The arrangement of the lid at the mold element is certainly such that the space is sealed to the surrounding, so that the heating is solely performed within the space.

As also the dimension of the lid corresponds to the size of the mold element in its maximum, also this lid, which is solely used for covering the building material and for realizing the heating space, may be arranged manually on top of the mold element, so that also, comparable to arranging the heating blanket, this heating means element may easily be arranged. Certainly also an arrangement using a lifting equipment is feasible.

The lid is adapted to create a U-shaped air channel within the space, which channel is coupled at one end to a heating air supply of the heating air source and with the other end to a heating air exhaust, which is connected to the circuit respectively the heating air supply. The coupling may be realized by means of respective pipes, which are connected to the heating air source and to the lid respectively the specific channel end. So, this embodiment defines a U-shaped airflow through the U-shaped space, with the first leg of the channel extending in the longitudinal direction of the mold, at the end of which the channel makes a U-turn to the second leg extending in the longitudinal direction of the mold to the exhaust, with the airflow being directed in opposite directions in the first and the second channel leg.

During the passage through the channel the air cools down, it is warmer at the channel entrance than at the exhaust. To avoid heat differences within the building material, it is advantageous that the flow direction can be reversed in certain intervals. Also, when the heating process comes to an end, it is advantageous if cool air can be circulated through the channel by the air supply, also in a reversing manner, so that a rapid and active cooling is possible.

As already mentioned, the mold arrangement may further comprise a vacuum foil to be arranged on the mold element and adapted to cover the preform building material arranged on the mold surface, and a vacuum pump for evacuating a space between the vacuum foil and the mold surface. As mentioned, the building material comprises several separate fiber mats, the binding agent and, optionally, one or more core elements. These separate items are loosely arranged on the mold surface. For pre-fixing them in order to avoid any shifting during the heating process, a vacuum foil is applied, which completely covers the preform building material and which also extends on the mold element and seals to the mold surface. The space between the vacuum foil and the mold element surface may be evacuated by a vacuum pump, so that the vacuum foil is firmly pressed or sucked against the building material which is therefore fixed in its position towards the mold element. Therefore, any unwanted shifting is avoided. The vacuum pump may be arranged below the mold element within the mold carrier and coupled to the space between the mold element and the vacuum foil by one or more vacuum openings.

As mentioned, the mold carrier is the basic construction carrying the mold element. The mold carrier may either be a wooden construction or a metal construction, which is adapted to carry the mold element, but also all items applied to or on it. This is the first and the second heating means, but also especially the blade building material. The blade building material itself has a remarkable weight of several hundred kilograms, usually of something between 500-800 kg, so that the mold carrier construction needs to be adapted to carry an overall load of approximately 1 ton for example.

Also, the mold element may be made of wood or metal. It also needs to be adapted to carry the respective weight of the building material and any other applied item like the vacuum foil or the heating blanket etc. It may also be made of wood or a reinforced polymer, which has a heat resistance which is sufficient to withstand the heating process, during which the preform building material is heated to approximately 70-90° ° C. Although the mold element is adapted to carry the respective weight, it is also desirable to keep the blade- or tray-like mold element as thin as possible in order to have a good heat transfer from the first heating means arranged below the mold element through the mold element to the preform building material.

BRIEF DESCRIPTION

Figure 2:
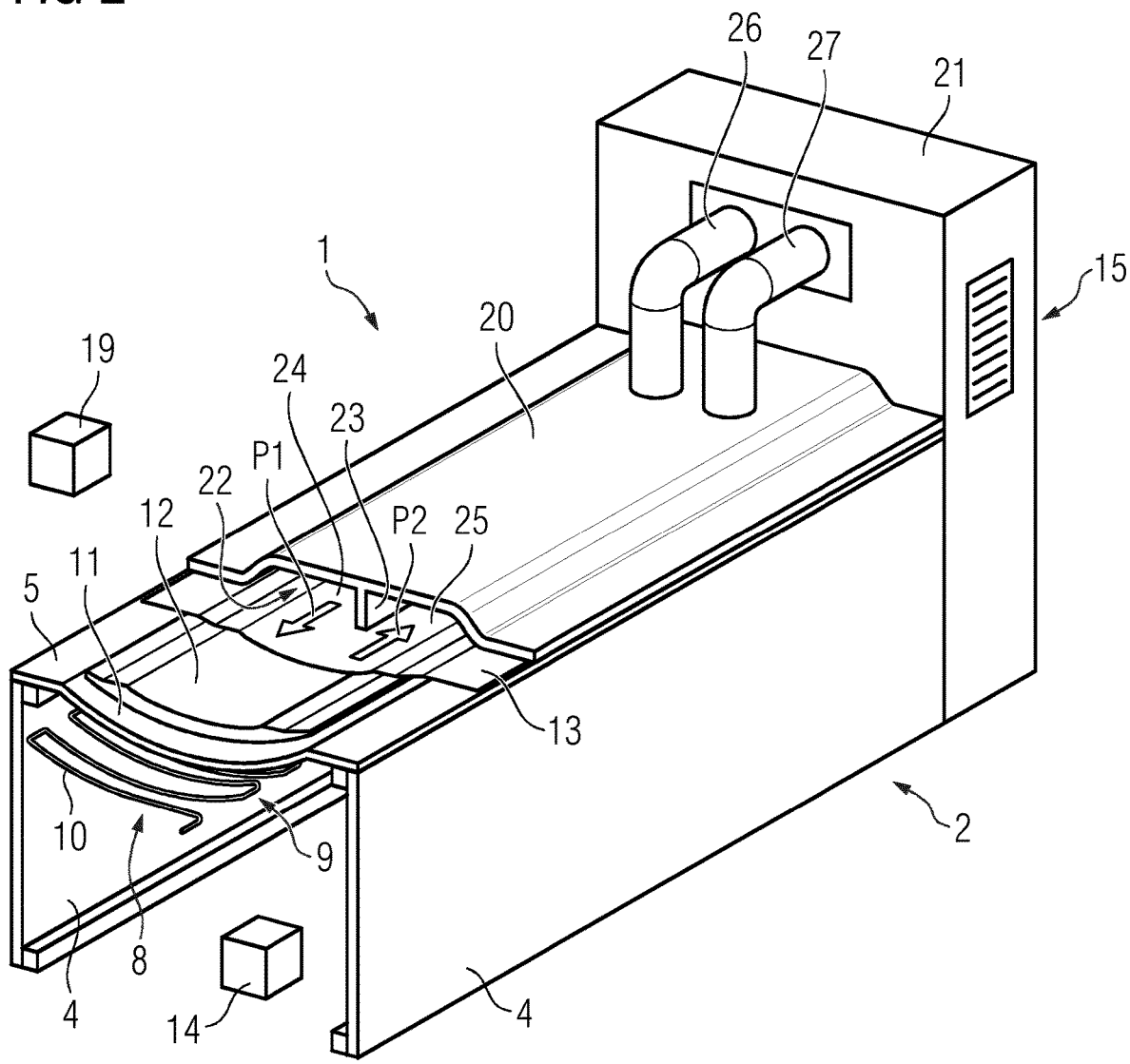

Some of the embodiments will be described in detail, with reference to the following figures, wherein like designations denote like members, wherein:

FIG. 1 is a principal illustration of an inventive mold arrangement of a first embodiment; and FIG. 2 is a principal illustration of an inventive mold arrangement of a second embodiment.

DETAILED DESCRIPTION

FIG. 1 shows a first embodiment of an inventive mold arrangement 1 in a shorter cut illustration, as the mold arrangement usually has a size of at least approximately 3-5 m in width and 10-12 m in length.

The mold arrangement is used for producing a preform element of a wind turbine. It comprises a mold carrier 2, which is either a wooden or a metal construction. In this principal embodiment, the mold carrier 2 comprises a bottom 3 and two side walls 4. On the mold carrier 2 a plate- or a tray-like mold element 5 is arranged, which in this embodiment has a slightly bent geometry or cross-section. The mold element 5 is either made of wood, metal or a reinforced polymer. It corresponds to the width and length of the mold carrier 2 and rests with its longitudinal edges 6 on the respective upper edges 7 of the side walls 4 of the mold carrier 2. The mold element 5 may either be firmly fixed to the mold carrier 2 or may be removable in order to change it to a mold element having a different cross-section or geometry in order to produce a different shaped preform element.

Below the mold element 5 a first heating means 8 is arranged. This heating means comprises a pipe arrangement 9 comprising at least one pipe 10, which is arranged in a meandering form and extends from one end of the mold element 5 to the other end. It is arranged directly underneath the bottom surface of the mold element 5, as close as possible or in direct contact. The pipe arrangement 9 is connected to or is part of a circuit, in which a heating fluid is circulating. This heating fluid may either be tempered heating water or tempered heating air. As the heating pipe arrangement 9 is arranged directly underneath the mold element 5, it heats the preform building material, which is arranged on top of the mold element 5, from underneath.

The mold element 5 has an upper mold surface 11, which, as mentioned, in this embodiment is slightly bent or curved. On this mold surface 11, which defines the final form or cross-sectional shape of the manufactured preform element, the preform building material 12 is arranged. This preform building material 12 comprises a number of fiber mats, desirably glass fiber mats, which are stacked on top of each other in separate layers, further, optionally, one or several core elements made for example from balsa wood or from polymer, and a binding agent, which is applied as a powder or a granulate but only locally on the mat- and core-arrangement, so that the fiber mats and if provided the core elements are only locally fixed. As FIG. 1 shows, the building material is only arranged in the concave bent part of the surface 11.

The building material 12 is arranged manually on the mold surface 11, as it is easily possible to handle the separate fiber mats, which have a width of for example 2-3 m and a length of for example 10-11 m, and to arrange them in the correct position on the mold element 5 respectively on top of each other. The same is true for the application of the binding agent and the optional core elements.

For fixing the building material 12 in its finally arranged position a vacuum foil 13 is placed on top of the building material 12. This vacuum foil extends to all four sides over the building material 12 and overlaps with the upper surface 11 of the mold element 5. The vacuum foil 13 delimits a certain space between itself and the mold element 5, in which space the building material 12 is arranged. This space is evacuated by means of a vacuum pump 14, which is connected by a respective tubing to the space between the vacuum foil 13 and the mold element 5. Due to this evacuation the vacuum foil 13 is sucked towards the mold element 5 thereby pressing against the building material 12, which is thereby vacuum-fixed.

Furthermore, a second heating means 15 is provided. This second heating means 15 is a heating blanket 16, in which one or more heating wires 17 are integrated, which can be coupled via a cable 18 to a power source. The heating blanket 16 has a size which corresponds to the size of the mold element 5, so that the heating blanket 16 almost or entirely covers the mold element 5 and therefore also the arrangement of the building material 12 and the vacuum foil 13. As the heating blanket 16 is flexible, it perfectly adapts to the shape of the underlying items or construction like to the surface of the vacuum foil 13.

As mentioned, FIG. 1 is only a principal illustration without any reference to the real dimensions. Certainly, the pipe arrangement 9 extends over the whole length or almost over the whole length of the mold carrier 3, the same is true for the mold element 5. Also, the building material 12 certainly extends over almost the entire length of the mold element 5, the same applies for the vacuum foil 13 and the heating blanket 16.

The first heating means 8 and the second heating means 15 are adapted to quickly and homogeneously heat the building material 12 in order to melt the binding agent, which may then wet the fiber mats and, if provided, the core elements. After finishing the heating, the fluid binding agent cures again and becomes a hardened glue or polymer matrix, in which the fiber mats and, if provided, the core elements are firmly, but locally embedded. The final preform element therefore comprises the fixed mat and core items and has a defined shape and setup, while it is still an open structure due to the mat structure allowing for a resin infusion, when the preform element is used for finally building the blade or the blade part.

To perform the heating, a heating fluid is circulated through the first heating means 8 respectively the pipe arrangement 9, which is connected to a circulating means 19, which is adapted to first circulate the heating water or the heating air and therefore comprises a pump or a ventilator, and which is secondly adapted to temper the water or the air. So, the tempered heating water or heating air circulates from the circulating means 19 to the pipe arrangement 9, through the pipe arrangement 9 and from the pipe arrangement 9 back to the circulating means 19, where it is again tempered.

As the first heating means 8 is arranged directly below the mold element 9, the heating of the building material 12 is heated through the mold element 5. This is easily possible, as the mold element 5 is a thin plate- or tray-like element, which is for example made of wood or a thin sheet metal or a, reinforced polymer. It is adapted to carry the load of the items arranged on it, i.e., the building material 12, the vacuum foil 13 and the heating blanket 16, which weight amounts to several hundred kilograms, as only the building material 12 may already weigh several hundred kilograms, i.e. something between 500-800 kg. Nevertheless, the mold element 5 is designed as thin as possible in order to have a good heat transfer from the first heating means 8 through the mold element 5 to the building material 12, which is heated from below.

The second heating means 15, i.e., the heating blanket 16 is heated by an electric current flowing through the one or more wires, which are thereby heated. It is only necessary to connect the heating blanket 16 to a power source.

Certainly, a respective heating control is provided, which controls the temperature of the heating fluid of the first heating means 8 and the temperature of the second heating means 15, in order to control the respective heating to a temperature or temperature interval which is necessary for heating the binding agent for melting it, but which avoids an overheating.

When the heating step is ended, no more heating fluid is circulated and the heating blanket 16 is also no longer active. The heated building material 12 may cool down, so that the melted binding agent cures and fixes the building material 12. Afterwards, the heating blanket 16 is removed, the vacuum pump 14 is switched off and the vacuum foil 13 is removed, so that the preform element, made from the building material 12, can be removed from the mold element 5 by a respective device.

FIG. 2 shows another embodiment of an inventive mold arrangement 1. The same reference numbers are used for the same or comparable items.

Also, this mold arrangement 1 comprises a mold carrier 2, which here only has two side walls 4. Firmly fixed to the side walls 4 is the mold element 5 with its upper mold surface 11. Also here, the mold element 5 is plate- or tray-like made of wood, metal or a reinforced polymer and is adapted to carry the respective load applied on it, while it is also as thin as possible in order to ascertain a good heat transfer.

Also here, a first heating means 8 in form of or comprising a pipe arrangement 9 with at least one pipe 10 is arranged with a meandering geometry directly underneath the mold element 5 and directly connected to the bottom surface of the mold element 5. The pipe arrangement 9 is again part of or connected to a circuit, in which a heating fluid circulates. This is realized by means of a circulating means 19 like a water pump or a ventilator, so that tempered water or tempered air flows through the pipe arrangement 9 for heating the mold element 5 and through the mold element 5 the building material 12 arranged on the surface 11.

As mentioned, the building material 12 comprises a certain number of fiber mats, desirably glass fiber mats, which are arranged one above the other or overlap each other on the mold surface 10, optionally together with one or more core elements. Also locally, the binding agent is applied to the fiber mat stack and the core elements.

After arranging the building material 12 a vacuum foil 13 is placed on top of the building material 12, which extends on all four sides over the building material 12 and overlaps with the mold element 5. The space between the vacuum foil 13 and the mold element 5 may then be evacuated by means of a vacuum pump 14 for sucking the vacuum foil 13 against the building material 12 respectively the mold element 5 thereby fixing the building material 12 in place.

Also here, a second heating means 15 is provided, which is an air heating means. It comprises a lid 20, which is placed on top of the mold element 5 and is tightly sealed towards the mold element 5. As shown, it extends over the vacuum foil 13 at the longitudinal sides, also at the not shown front end a respective sealing is provided, as also a sealing is provided at the shown back end towards a heating air supply 21. The lid 20, which may also be made of wood, desirably light wood, metal or a polymer, can easily be arranged manually or with a lifting equipment on top of the mold element 5, as its width and length correspond to the width and length of the mold element 5.

The lid has a design that make it fit to various or all different preform geometries that can be built on the mold arrangement 1.

As shown, the lid 20 delimits a space 22 between the lid 20 and the mold element 5. In this sealed space 22 tempered air is blown by the heating air supply 21 and is also exhausted from this space 22. So, in this embodiment a hot air heating of the building elements from above is realized, together with the second heating from below.

As shown, the lid 20 comprises a web 23 extending towards the mold element 5. By this web 23 the space 22 can be split into a U-shaped channel, comprising a first channel leg 24, which at the not shown end of the space 22 makes a U-turn and communicates with a second channel leg 25. The first channel leg 24 is connected to the heating air source 21 by a heat supply 26 realized with a tube, while the second channel leg 25 is connected to the heating air source 21 by an exhaust 27 also realized by means of a tube. In this embodiment a heating air circuit is realized, in which the heating air circulates. The heating air is tempered in the heating air source 21 and blown in the first channel leg 24 or sucked from the second channel leg 25 in order to circulate it. The respective flow paths in the first and second channel leg 24, 25 is shown by the respective arrows P1 and P2.

Also, in this embodiment, a double side heating of the building material 12 is realized. It is heated by the first heating means 8 from below through the mold element 5 and is heated from above by the second heating means 15. Again, the respective temperature of the heating water or heating air of both heating means 8, 15 is precisely controlled in order to maintain the heating temperature in a respective temperature interval. After the heating has ended, the lid 20 is removed. Also, the vacuum pump 14 is switched off, so that the vacuum foil 13 may be removed. The melted binding agent may cure or has already cured, so that finally the preform element may be removed from the mold element 5. Further it is possible to use the air supply 21 also as a cooling means, as it is possible to blow cooling air, e.g., ambient air into the U-shaped channel. This accelerates the cooling of the preform element.

While the first heating means 8 in both embodiments is shown as a pipe arrangement 9 through which heating water or heating air, i.e., a heating fluid circulates, it is certainly also possible to use one or more wires, through which an electric current flows for heating the wires. Also, this wire arrangement may for example have a meandering shape and is directly fixed to the bottom of the mold element 5. It is only necessary to connect this wire arrangement to a power source. So, in this embodiment, the heating is done by an electric current, comparable to the heating method of the heating blanket 16.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A mold arrangement for producing a preform element of a wind turbine blade, comprising:
   a mold carrier and a mold element arranged at the mold carrier with a form defining mold surface configured to receive preform building material,
   a first heating device arranged below the mold element for heating the preform building material from below the mold element, and
   a second heating device for heating the preform building material from above,
   wherein the second heating device comprises a lid configured to be attached to the mold element and to cover the preform building material while creating a space between the mold surface and the lid, wherein the space is coupled to a heating air source configured to blow a circulating heating air in the space, wherein the lid includes a web splitting the space into a U-shaped air channel, and wherein the U-shaped air channel is coupled at one end to a heating air supply and at the other end to a heating air exhaust.

2. The mold arrangement according to claim 1, wherein the first heating device comprises one or more pipes extending below the mold element configured to carry a circulating heating fluid.

3. The mold arrangement according to claim 2, wherein the one or more pipes are configured to carry tempered heating water or heating air.

4. The mold arrangement according to claim 1, wherein the first heating device comprises one or more wires extending below the mold element to be coupled to a power source.

5. The mold arrangement according to claim 1, wherein the second heating device is a heating blanket configured to be arranged on the mold element for covering the preform building material.

6. The mold element according to claim 5, wherein the heating blanket comprises one or more wires to be coupled to a power source.

7. The mold arrangement according to claim 1, wherein it comprises a vacuum foil to be arranged on the mold element and configured to cover the preform building material arranged on the mold surface, and a vacuum pump for evacuating a space between vacuum foil and mold surface.

8. The mold arrangement according to claim 1, wherein the mold carrier is a wooden or metal construction, and that the mold element and the lid is made of wood, metal or a reinforced polymer.

9. The mold arrangement according to claim 1, wherein the mold element is a plate or a tray.

* * * * *